United States Patent
Kristen et al.

[11] Patent Number: 5,907,208
[45] Date of Patent: May 25, 1999

[54] ROTOR FOR AN ELECTRIC MOTOR

[75] Inventors: Ferdinand Kristen, Gilching; Hans Appel, Munich, both of Germany

[73] Assignee: Hilti Aktiengesellschaft, Schaan, Liechtenstein

[21] Appl. No.: 09/012,635

[22] Filed: Jan. 23, 1998

[30] Foreign Application Priority Data

Jan. 27, 1997 [DE] Germany .................. 197 02 737

[51] Int. Cl.⁶ ........................................... H02K 1/22
[52] U.S. Cl. .................... 310/261; 310/231; 310/233; 310/235
[58] Field of Search ..................... 310/261, 231, 310/233, 235

[56] References Cited

U.S. PATENT DOCUMENTS

| | | |
|---|---|---|
| 2,319,892 | 5/1943 | Korte . |
| 4,663,835 | 5/1987 | Caillier, Sr. . |
| 5,459,365 | 10/1995 | Yuhl .......................................... 310/233 |

FOREIGN PATENT DOCUMENTS

| | | |
|---|---|---|
| 2543549 | 4/1977 | Germany . |
| 2649121 | 5/1977 | Germany . |
| 4432356 | 3/1996 | Germany . |
| 8000152 | 10/1980 | United Kingdom . |

*Primary Examiner*—Nestor Ramirez
*Assistant Examiner*—Thanh Lam
*Attorney, Agent, or Firm*—Anderson, Kil &Olick, P.C.

[57] ABSTRACT

A rotor for an electric motor, including a shaft (1), a lamination parcel (2) and a current distribution element (3), which are mounted on the shaft (1) coaxially therewith and for joint rotation therewith, and insulating sleeve members (4,5) coaxially mounted on the shaft (1) one behind another for insulatingly supporting, respectively, the lamination parcel (2) and the current distributions element (3) on the shaft (1).

8 Claims, 3 Drawing Sheets

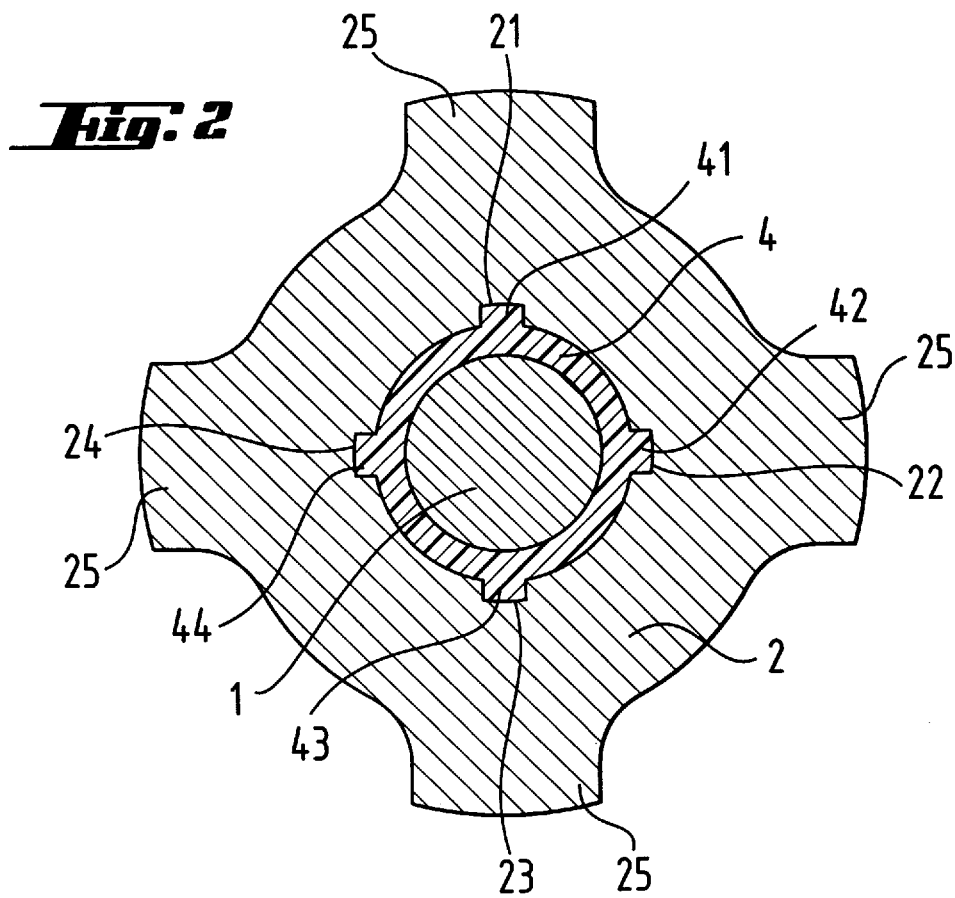
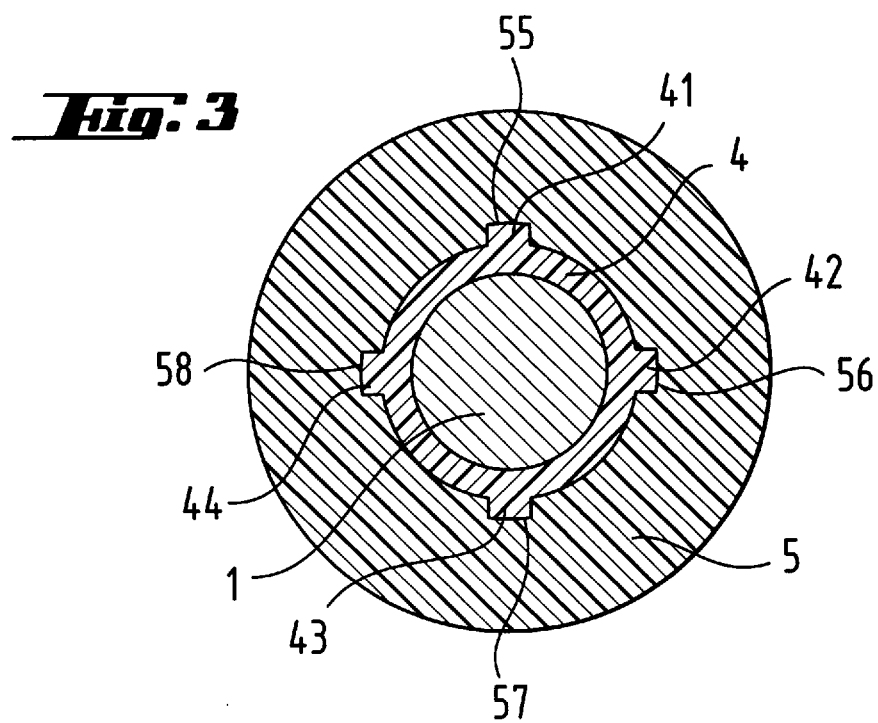

ROTOR FOR AN ELECTRIC MOTOR

BACKGROUND OF THE INVENTION

1. Field of the Invention

The present invention relates to a rotor for an electric motor including a shaft, a lamination parcel and a current distribution element which are mounted on the shaft coaxially with the shaft for joint rotation with the shaft, and an insulating layer that insulates the lamination parcel and the current distribution element from the shaft.

2. Description of the Prior Art

German Publication DE -OS 25 43 549 discloses an electromotor for a hand-held power tool and which can be used, e.g., as a drive motor in drilling and chisel tools. Because in this electric motor the lamination parcel and the current distribution element, which is formed as a commutator, have different inertia moment, different acceleration forces act on the lamination parcel and the current distribution element, in particular during actuation of the electric motor or its braking. These acceleration forces may result in the lamination parcel and the current distribution element rotating in opposite directions. To avoid such opposite rotation, the lamination parcel and the current distribution element of the known electric motor are mounted on the rotor shaft for joint rotation therewith by an intermediate steel pipe separated from the shaft with an insulating layer.

Because the current distribution element is formed of segment-shaped sections each of which cooperates with one rotor pole, alignment of separate sections of the current distribution element with the rotor poles of the lamination parcel in the circumferential direction is necessary. In the known electric motor, the alignment is achieved by using a steel pipe onto which both the lamination parcel and the current distribution element are pressed-on before the steel pipe is connected with the rotor shaft for joint rotation with the shaft, with the insulating layer being provided between the shaft and the steel pipe. The insulating layer can be formed, e.g., as a plastic sleeve glued between the steel pipe and the rotor shaft. The drawback of glue connections consist in that at high motor temperatures, they become destroyed which leads to a damage of an electric motor. It is also possible to form the insulating layer by injection. With this method of forming the insulation layer, first, the steel pipe and the rotor shaft should be secured in a retaining device in which the steel pipe should be so retained against the rotor shaft that a cylindrical clearance is formed between the two parts. The injection of the insulating layer is associated with increased cost associated in part by a need for additional equipment. Furthermore, cooling of the insulating layer consumes a large amount of time.

Accordingly, an object of the present invention is to provide an electric motor and, more specifically, a rotor for an electric motor the insulating layer of which can be economically produced and rapidly and simply connected with the rotor shaft for joint rotation therewith. The insulating layer should further insure a simple alignment of the current distribution element with the lamination parcel and should provide for mounting of the lamination parcel and the current distribution element on the rotor shaft for joint rotation with the shaft. At that, the total weight of the rotor assembly should be a s small as possible.

SUMMARY OF THE INVENTION

These and other objects of the present invention, which will become apparent hereinafter, are achieved by forming the insulating layer of two sleeve members which are mounted on the shaft coaxially therewith behind one another for insulatingly supporting thereon the lamination parcel and the current distribution element, respectively.

The forming, according to the present invention, the insulation layer of two coaxially mounted, arranged one after another sleeve members simplifies mounting of the lamination parcel and the current distribution element on the shaft and facilitate the alignment of the current distribution element with the lamination parcel in the circumferential direction. E.g., it is possible to first fixedly mount the lamination parcel with a respective sleeve member on the rotor shaft and to align the second sleeve member with the current distribution element with respect to the lamination parcel before securing on the rotor shaft the second sleeve member with the current distribution element. Because of their smaller length, both sleeve members have a very high buckling resistance in effect, so high that they can be mounted on the rotor shaft, e.g., by being pressed onto the shaft.

Because the lamination parcel, which is supported on the first sleeve member, is not rotated relative to its supporting sleeve member by mechanical loads applied to the rotor, preferably the fixed connection between the lamination parcel and its supporting sleeve, which insures their joint rotation, is formed by a catching profile formed on an outer surface of the first sleeve member and a first counter-profile formed on an inner surface of the lamination parcel and form-lockingly engageable with the catching profile of the first sleeve member.

In order to prevent the rotation of the current distribution element relative to its supporting sleeve member by loads acting on the rotor, advantageously a fixed connection of the current distribution element and the sleeve member, which supports it, is formed by a respective catching profile formed on an outer surface of the second sleeve member, and a second counter-profile formed on an inner surface of the current distribution element and form-lockingly engageable with the second catching profile of the second sleeve member.

In order to insure a fixed connection of the lamination parcel and the current distribution element with respect to each other or a fixed connection of both sleeve members relative to each other, advantageously a form-locking connection, which acts in a circumferential direction, is provided between the two sleeve members.

It is, e.g., possible to align the current distribution element with the lamination parcel when a form-locking connection between the two sleeve members is formed. To this end, it is necessary, before connecting the two sleeve members, to mount the lamination parcel on the first sleeve member in a predetermined position with respect to the catching profile of the first sleeve, and to mount the current distribution member on the second sleeve member in a predetermined position with respect to the connection profile of the second sleeve member.

In order to avoid a need in an additional shaping of adjacent to each other end surfaces of both sleeve members, the form-locking connection of the two sleeve members is effected by forming a connection profile on an inner surface of a portion of the second sleeve member, which overlaps a portion of the first sleeve member which extends into the bore formed in the second member, and with the connection profile form-lockingly engaging the catching profile formed on the first sleeve member.

Preferably, the catching profile of the first, the lamination parcel supporting sleeve member is formed of at least one projection extending parallel to the longitudinal axis of the rotor shaft, and the corresponding counter-profile on the lamination parcel as well as the connection profile on the second sleeve are formed as matching recesses, respectively. Because of forming the catching profile of the first sleeve member as a projection, it is possible to make the wall thickness of a portion of the first sleeve member, which extends into the second sleeve member, and of the portion of the first sleeve member on which the lamination parcel is supported, much smaller. The reesses are formed, respectively, in the inner surface of the receiving bore of the second sleeve member and in the inner wall of the through-bore of the lamination parcel. Both the lamination parcel and the second sleeve member have large radial extensions in the areas of the recesses.

In the second sleeve member, the connection profile formed in the receiving bore and its catching profile can be arranged one above another. Because the catching profile of the second sleeve member is formed of at least one recess and the courter-profile of the current distribution element is formed as a matching projection, a small wall thickness of the second sleeve member in the area of these profiles is not acceptable as the small thickness could result in the damage of the second sleeve member.

Both catching profiles of the first and second sleeves members can be formed, respectively, of at least one projection provided on the outer surface of both sleeve members. The first and second counter-profiles can be formed, respectively, of at least one recess formed on the inner surface of the lamination parcel, the current distribution element and the second sleeve member.

After the rotor is formed, it is important to balance it before it is assembled, together with the stator and other components, to form an electric motor. To make the balancing of the rotor possible, the sleeve members are associated with balancing masses.

The balancing is effected by removing material from a balancing mass in each circumferential region, in which the largest centrifugal force occurs, by forming a blind bore in the mass. The balancing masses can be formed by at least one separate mass for each sleeve member, which is provided in an adjacent to the lamination parcel region. This mass can be a part of the sleeve member.

BRIEF DESCRIPTION OF THE DRAWINGS

The features and objects of the present invention will become more apparent, and the invention itself will be best understood from the following detailed description of the preferred embodiment when read with reference to the accompanying drawings, wherein:

FIG. 2 shows a cross-sectional view along line 2—2 of the rotor shown in FIG. 1;

FIG. 3 shows a cross-sectional view along line 3—3 of the rotor shown in FIG. 1.

DETAILED DESCRIPTION OF THE PREFERRED EMBODIMENT

Figure 1:
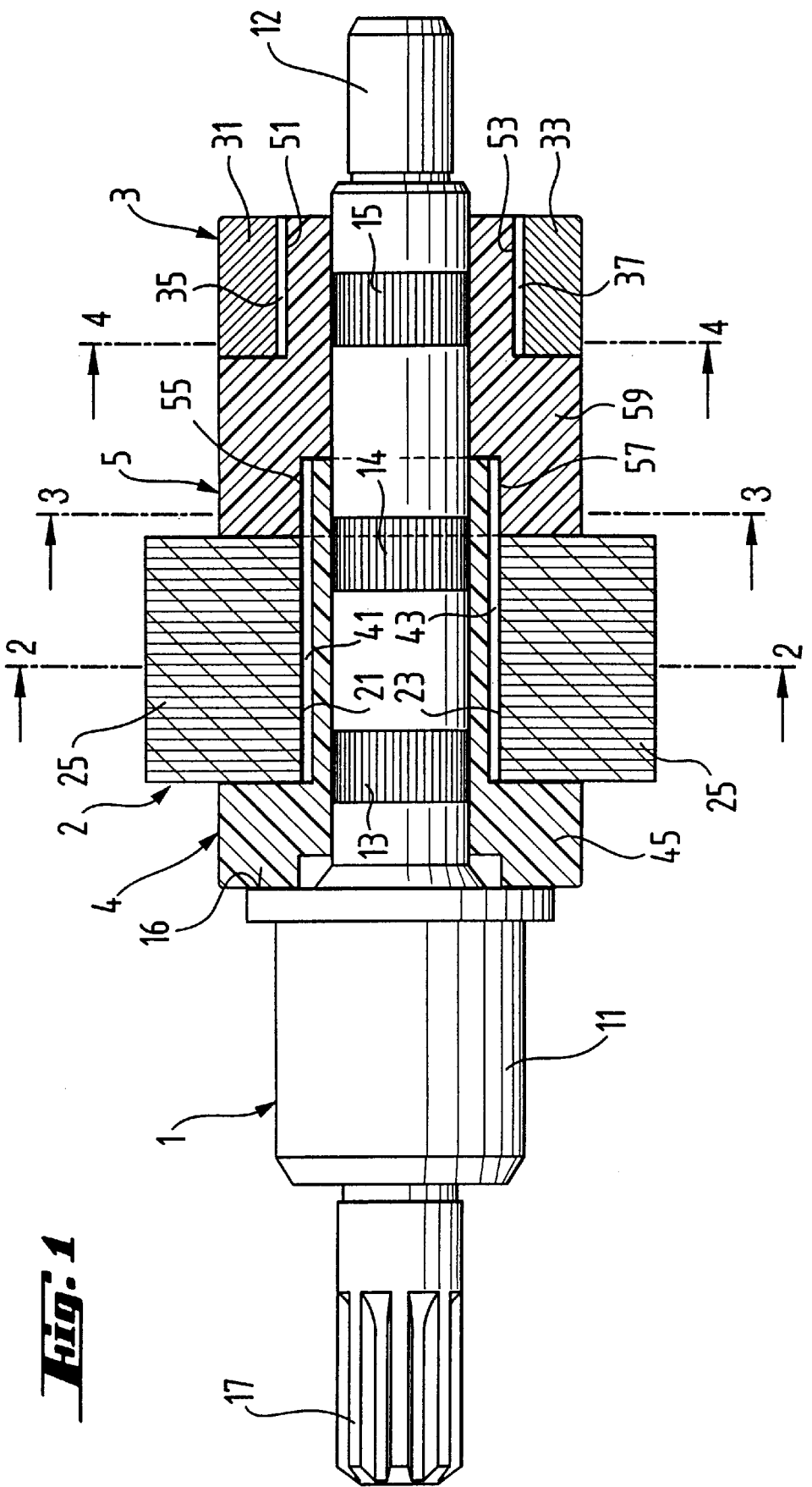
FIG. 1 shows a partially cross-sectional view of a rotor according to the present invention.

A rotor according to the present invention for an electromotor (now shown in detail) and which is shown in the drawings, includes a shaft 1, a lamination parcel 2, a current distribution element 3, and an insulation layer formed of two sleeve members 4 and 5. At its first free end, the shaft is provided with a toothing 17 which serves for transmission of a rotational movement, which is generated by the electromotor, to a driven structural component (not shown). A bearing surface 11 for a deep-groove ball bearing (not shown) adjoins the toothing 17. The bearing surface 11 is substantially cylindrical, and its diameter exceeds, in a radial direction, the addendum diameter of the toothing 17.

The shaft 1 has, at an end region of the first bearing surface 11 remote from the toothing 17, a flange-like widening having a stop surface 16 remote from the toothing 17. The shaft 1 further has a cylindrical seat portion which extends from the stop surface 16 and the diameter of which substantially corresponds to the addendum diameter of the toothing. The seat portion has a plurality, e.g., three spaced from each other sections provided with knurlings 13, 14, 15, respectively. The knurlings 13, 14, 15 serve for frictional mounting of the sleeve members 4, 5 on the shaft 1. At its opposite, with respect to the toothing 17, end, the shaft 1 has a second bearing surface 12 for supporting another deep-groove ball bearing (likewise not shown). The second bearing surface 12 is shaped as a journal and has a diameter which is smaller than the diameter of the seat portion.

Figure 4:
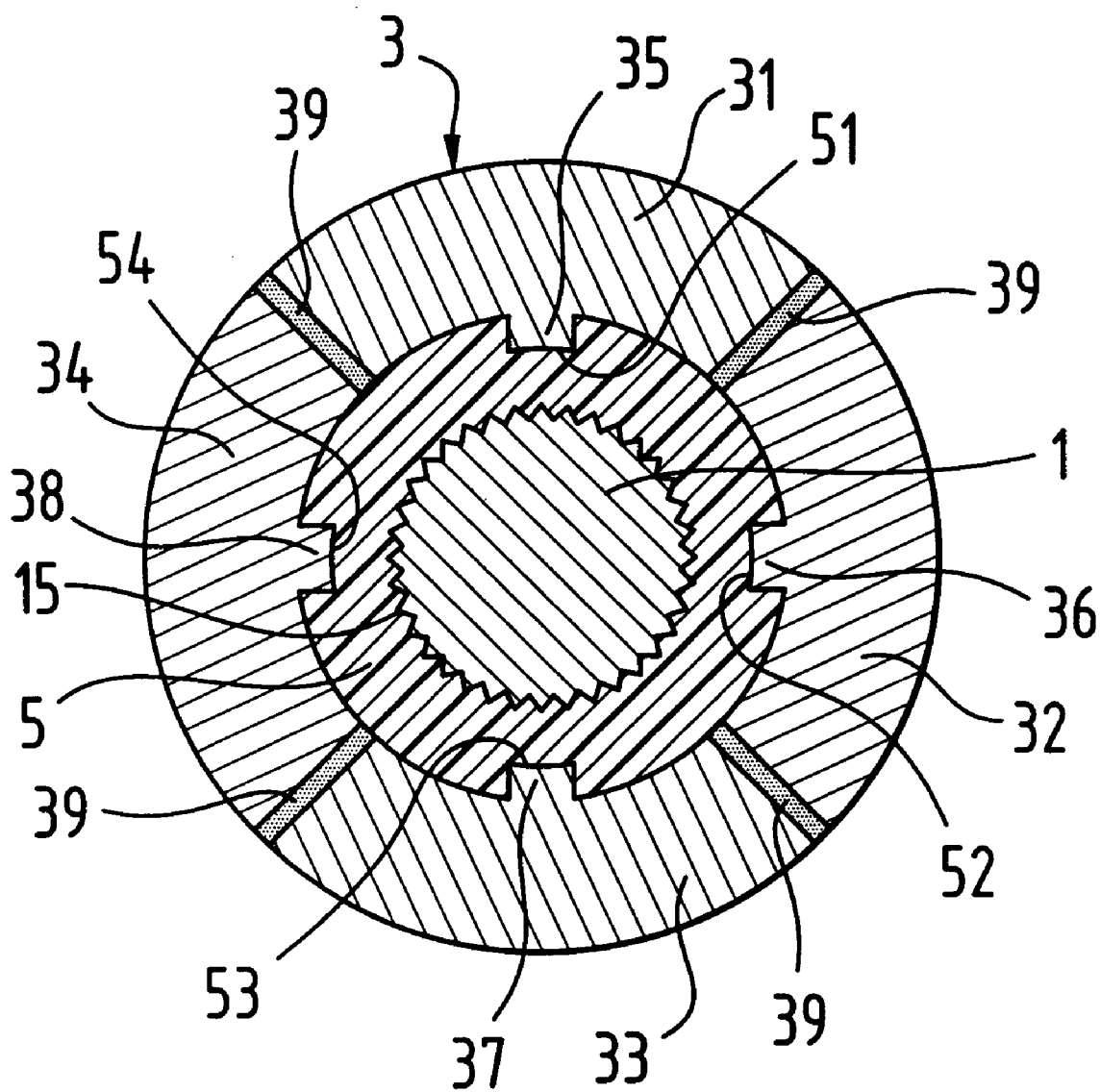
FIG. 4 shows a cross-sectional view along line 4—4 of the rotor shown in FIG. 1.

The lamination parcel 2 and the current distribution element 3 are insulated from the shaft 1 by an insulation layer which is formed by the sleeve members 4 and 5, respectively, as shown in detail in FIGS. 2–4. A portion of the first sleeve member 4 extends through the lamination parcel 2. As shown in FIG. 2, a first catching profile 41, 42, 43, 44, which is formed of a plurality of projections extending parallel to a longitudinal axis of the shaft 1 and substantially uniformly distributed in a circumferential direction on the outer contour, is provided on the portion of the first sleeve member 4 which extends through the lamination parcel 2. The first catching profile cooperates with a similarly arranged and correspondingly formed first counter-profile 21, 22, 23, 24 of the lamination parcel 2.

A portion of the first sleeve member 4, which projects beyond the lamination parcel 2, extends into a receiving bore of the second sleeve member 5, with its first catching profile 41, 42, 43, 44 cooperating, in a circumferential direction as shown in FIG. 3, rotationally and form-lockingly with a matching connection profile 55, 56, 57, 58 which is provided on the inner wall of the receiving bore of the second sleeve member 5 and which has a plurality of recesses extending parallel to the longitudinal axis of the shaft 1. Likewise, the second sleeve member 5 has a second catching profile 51, 52, 53, 54 which cooperates with a second counter-profile 35, 36, 37, 38 on the current distribution element 3. The first catching profile 41, 42, 43, 44, the second catching profile 51, 52, 53, 54, the first counter-profile 21, 22, 23, 24, the second counter-profile 35, 36, 37, 38, and the connection profile 55, 56, 57, 58 can be formed of more than three projections and recesses, respectively. The lamination parcel 2 has rotor poles 25 uniformly distributed on its circumference.

The current distribution element 3, which is formed of four segment-like sections 31, 32, 33, 34 is connected to the sleeve member 5 for joint rotation therewith. The fixed connection of the current distribution element 3 with the second sleeve member 5 is achieved by a form-locking engagement of the catching profile 51, 52, 53, 54 of the second sleeve member 5 with the counter-profile 35, 36, 37, 38 which is provided on the current distribution element 3. The second catching profile 51, 52, 53, 54 has four recesses, which are uniformly distributed on the outer circumference of the second sleeve member 5 and which extend parallel to the longitudinal axis of the shaft 1. The second counter-profile 35, 36, 37, 38 is formed of four projections corresponding to the four recesses of the second catching profile. The segment-like sections 31, 32, 33, 34 of the current distribution element 3 are formed of hard copper lamellas separated from each other with respective insulation shims 39. The current distribution element 3 can also, e.g., be formed of a ring having a plurality of magnets uniformly distributed on its circumference.

The section of the first sleeve member 4, which is located between the lamination parcel 2 and the stop surface 16 of the shaft 1 functions as a first discrete balancing mass 45, and the section of the second sleeve member 5 between the lamination parcel 2 and the current distribution element 3 functions as a second discrete balancing mass 59. Both sleeve members 4 and 5 have, in the regions of the balancing mass 45, 59, a greater wall thickness which can be machined in order to provide for a better balancing of the rotor.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A rotor for an electric motor, comprising, a shaft (1); a lamination parcel (2) and a current distribution element (3) which are mounted on the shaft (1) coaxially therewith and for joint rotation therewith; and means for insulating the lamination parcel (2) and the current distribution element (3) from the shaft (1), the insulating means comprising first and second sleeve members (4,5) coaxially mounted on the shaft (1) one behind another for insulatingly supporting, respectively, the lamination parcel (2) and the current distribution element (3) on the shaft (1).

2. A rotor according to claim 1, comprising means for mounting the lamination parcel (2) on the first sleeve member (4) for joint rotation therewith, the mounting means comprising first catching profile (41, 42, 43, 44) formed on an outer surface of the first sleeve member (4), and a first counter-profile (21, 22, 23, 24) formed on an inner surface of the lamination parcel (2) and form-lockingly engageable with the catching profile (41, 42, 43, 44) of the first sleeve member (4).

3. A rotor according to claim 1, comprising means for mounting the current distribution element (3) on the second sleeve member (5) for joint rotation therewith, the mounting means comprising a second catching profile (51, 52, 53, 54) formed on an outer surface of the second sleeve member (5) and form-lockingly engageable with a second counter-profile (35, 36, 37, 38) formed on an inner surface of the current distribution element (3).

4. A rotor according to claim 3, wherein the second catching profile comprises at least one indentation extending parallel to a longitudinal axis of the shaft (1), and the second counter-profile comprises at least one matching projection.

5. A rotor according to claim 1, further comprising means for form-lockingly connecting first (4) and second (5) sleeve members.

6. A rotor according to claim 5, wherein the form-lockingly connecting means comprise a connection profile (55, 56, 57, 58), which is formed on an inner surface of a portion of the second sleeve member (5) overlapping a portion of the first sleeve member (4) extending thereinto and which form-lockingly engages the first catching profile (41, 42, 43, 44) of the first sleeve member (4).

7. A rotor according to claim 6, wherein the first catching profile comprises at least one projection extending parallel to a longitudinal axis of the shaft (1), and the first counter-profile (21, 22, 23, 24) and the connection profile comprise at least one matching indentation.

8. A rotor for an electric motor, comprising, a shaft (1); a lamination parcel (2) and a current distribution element (3) which are mounted on the shaft (1) coaxially therewith and for joint rotation therewith; and means for insulating the lamination parcel (2) and the current distribution element (3) from the shaft (1), the insulating means comprising first and second sleeve member (4, 5) coaxially mounted on the shaft (1) one behind another for insulatingly supporting, respectively, the lamination parcel (2) and the current distribution element (3) on the shaft (1), wherein each sleeve member (4, 5) is connected with a respective balancing mass (45, 59).

\* \* \* \* \*